(12) United States Patent
Liu et al.

(10) Patent No.: US 12,530,750 B2
(45) Date of Patent: Jan. 20, 2026

(54) IMAGE PROCESSING METHOD AND APPARATUS, ELECTRONIC DEVICE, STORAGE MEDIUM AND CHIP

(71) Applicant: Beijing Xiaomi Mobile Software Co., Ltd., Beijing (CN)

(72) Inventors: Shuai Liu, Beijing (CN); Jingyuan Xiao, Beijing (CN); Pan Ye, Beijing (CN); Chaoyu Feng, Beijing (CN); Lei Lei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 540 days.

(21) Appl. No.: 17/898,890

(22) Filed: Aug. 30, 2022

(65) Prior Publication Data
US 2023/0385993 A1  Nov. 30, 2023

(30) Foreign Application Priority Data
May 30, 2022  (CN) .......................... 202210602418.4

(51) Int. Cl.
*G06T 5/50* (2006.01)
*G06T 5/77* (2024.01)

(52) U.S. Cl.
CPC ................. *G06T 5/77* (2024.01); *G06T 5/50* (2013.01); *G06T 2207/20008* (2013.01); *G06T 2207/20012* (2013.01); *G06T 2207/20221* (2013.01)

(58) Field of Classification Search
CPC .... G06T 5/77; G06T 5/50; G06T 5/70; G06T 2207/20008; G06T 2207/20012; G06T 2207/20221; H04N 9/64; H04N 23/80; H04N 23/70
See application file for complete search history.

(56) References Cited

U.S. PATENT DOCUMENTS

2020/0234044 A1* 7/2020 Cai ......................... H04N 23/80
2021/0383176 A1* 12/2021 Wu ............................ G06T 7/11

FOREIGN PATENT DOCUMENTS

| CN | 109688351 A | 4/2019 |
| CN | 110855958 A | 2/2020 |
| CN | 110909778 A | 3/2020 |
| CN | 113938602 A | 1/2022 |
| CN | 114359289 A | 4/2022 |
| EP | 3674967 A1 | 7/2020 |
| JP | 2005005838 A | 1/2005 |

OTHER PUBLICATIONS

Extended European Search Report dated May 23, 2023 for European Patent Application No. 22192893.0.
Guoshuai et al., "Fast classification of natural scene and born-digital images" (1991).

* cited by examiner

*Primary Examiner* — Carol W Chan
(74) *Attorney, Agent, or Firm* — Volpe Keonig

(57) ABSTRACT

An image processing method is provided. The method includes: obtaining a to-be-processed image; extracting attribute information of the to-be-processed image; determining an image processing strategy corresponding to the to-be-processed image according to the attribute information; and obtaining a target image by processing the to-be-processed image according to the image processing strategy.

18 Claims, 4 Drawing Sheets

IMAGE PROCESSING METHOD AND APPARATUS, ELECTRONIC DEVICE, STORAGE MEDIUM AND CHIP

CROSS REFERENCE TO RELATED APPLICATIONS

The present application claims the benefit of priority to Chinese Application No. 202210602418.4, filed on May 30, 2022, the contents of which are incorporated herein by reference in their entireties for all purposes.

BACKGROUND

As hardware and software of imaging devices (mobile phone cameras, digital cameras, etc.) gradually advance, a demand for an imaging effect keeps increasing. However, the image processing method in the related art still has a problem of poor imaging effect.

SUMMARY

The disclosure provides an image processing method and apparatus, an electronic device, a storage medium and a chip.

According to a first aspect of examples of the disclosure, an image processing method is provided. The method includes:

obtaining a to-be-processed image;

extracting attribute information of the to-be-processed image;

determining an image processing strategy corresponding to the to-be-processed image according to the attribute information; and obtaining a target image by processing the to-be-processed image according to the image processing strategy.

According to a second aspect of examples of the disclosure, an electronic device is provided. The electronic device includes:

a memory storing a computer program; and a processor configured to execute the computer program in the memory, to implement steps of the image processing method provided in the first aspect of the disclosure.

According to a third aspect of examples of the disclosure, a computer-readable storage medium is provided. The computer-readable storage medium stores a computer program instruction, where when executed by a processor, the program instruction implements steps of the image processing method provided in the first aspect of the disclosure.

According to a fourth aspect of examples of the disclosure, a chip is provided. The chip includes a processor and an interface, where the processor is configured to read an instruction, to execute steps of the image processing method provided in the first aspect of the disclosure.

It is to be understood that both the foregoing general description and the following detailed description are illustrative and explanatory and are not restrictive of the disclosure.

BRIEF DESCRIPTION OF THE DRAWINGS

The accompanying drawings, which are incorporated herein to constitute a part of this specification, illustrate examples consistent with the disclosure and, together with the description, serve to explain the principles of the disclosure.

DETAILED DESCRIPTION

Figure 1:
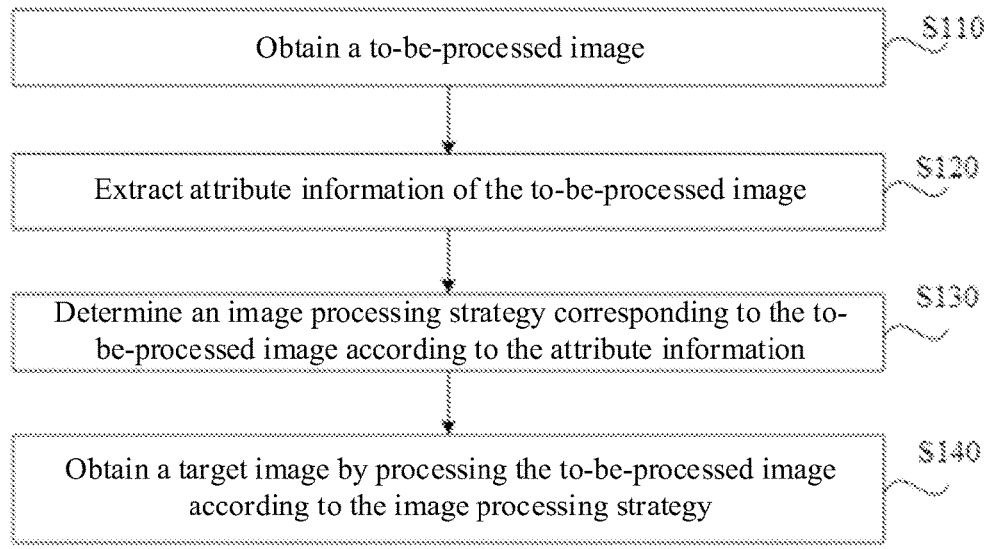
FIG. 1 is a flowchart of an image processing method according to an example.

Description will herein be made in detail to examples, instances of which are illustrated in the accompanying drawings. When the following description refers to the accompanying drawings, the same numbers in different accompanying drawings refer to the same or similar elements unless otherwise indicated. The implementation modes described in the following examples do not represent all implementation modes consistent with the disclosure. Rather, they are merely instances of apparatus and methods consistent with some aspects of the disclosure as detailed in the appended claims.

It is to be noted that in the present disclosure, all the actions of obtaining a signal, information or data are performed under the premise of complying with corresponding data protection laws and regulations of the country where they are located and obtaining the authorization given by an owner of a corresponding apparatus.

The disclosure relates to the technical field of image technology, and particularly relates to an image processing method and apparatus, an electronic device, a storage medium and a chip.

As noted in the background, a demand for an imaging effect keeps increasing. During imaging, a color, noise, sharpening, brightness and inter-frame stability of an image are factors that affect the imaging effect. An imaging device generally uses an image signal processing (ISP) system to perform imaging, so as to improve an imaging effect of an image.

However, when performing image color restoration processing, an auto white balance (AWB) module in the ISP system adjusts a color according to brightness statistical information of an input image. A processing result of the color has a great influence on final perception, and demands for color processing from scenes with different contents are different, for instance, cold and warm tones, different hue saturation, etc.

In addition, in the ISP system, for the processing of noise, detail, edge sharpness, etc., each image is basically composed of a plurality of brightnesses, noise forms and frequencies. For instance, in a city night scene image, a building region has a high brightness, low noise and high frequency, and a sky region has a low brightness, high noise and low frequency. However, corresponding processing algorithms commonly used in the ISP system all process the whole image in a general way with lack of pertinence. In this way, processing results for all regions are in an intermediate state or biased towards one side, rather than in an optimal state. For instance, high noise regions are processed incompletely, while details of low noise regions are erased.

In addition, for a video inter-frame stability algorithm, the ISP system has a strategy to align first and then fuse. In order to ensure an imaging speed, simple and rapid traditional alignment algorithms are generally used, for instance, a Homography algorithm for global alignment, an optical flow method for pixel-by-pixel alignment, etc. However, for some regions difficult to align, for instance, a foreground motion region, a local large motion region, a dark motion region, etc., the traditional alignment algorithm may not extract feature points effectively, and an alignment effect is poor. Fusion requires high accuracy of alignment, and under the condition that the alignment algorithm is not effective, the fusion will generate a ghost, which greatly influences image perception.

It may be seen that the image processing method in the related art still has a problem of poor imaging effect.

In view of this, the examples of the disclosure provide an image processing method and apparatus, an electronic device, a storage medium and a chip. An image processing strategy may be selected according to features of the to-be-processed image to process the to-be-processed image, so as to improve the imaging effect of the obtained target image.

FIG. 1 is a flowchart of an image processing method according to an example. As shown in FIG. 1, an image processing method may be applied to an electronic device, and the electronic device may be, for instance, a mobile phone, a camera, a notebook, a tablet computer, an intelligent wearable device with a photographing function, etc. The image processing method includes:

S110, a to-be-processed image is obtained.

In some implementation modes, the electronic device may obtain the to-be-processed image by a built-in image sensor. In this case, the to-be-processed image may be an original image obtained by the image sensor, that is, an original RAW (RAW Image Format) image output by the image sensor is obtained as the to-be-processed image.

Furthermore, considering that in practice, after obtaining the original RAW image output by the image sensor, various intermediate processes may be performed on the original RAW image, so as to obtain and output a RAW image satisfying requirements. Thus, in some other implementation modes, the to-be-processed image may also be an intermediate RAW image obtained after processing the original RAW image according to at least one image processing strategy.

In some implementation modes, the to-be-processed image may be a target image obtained after processing the original image according to at least one image processing strategy of a color adjustment strategy, an image enhancement strategy and an image alignment strategy.

Illustratively, for a single-image imaging scene, for instance, a photographing scene, after obtaining an original RAW image output by the image sensor, a color adjustment strategy and an image enhancement strategy may be used to process the original RAW, so as to obtain and output a RAW map satisfying requirements. In this case, the original RAW image or the intermediate RAW image obtained after processing the original RAW image by means of the color adjustment strategy may be used as a to-be-processed image.

Illustratively, for a multi-image imaging scene, for instance, a video shooting scene, after obtaining a plurality of original RAW images output by the image sensor, a color adjustment strategy, an image enhancement strategy and an image alignment strategy may be used to process the original RAW, so as to obtain a plurality of RAW images satisfying the requirements for video output. In this case, the original RAW image, or the intermediate RAW image obtained after processing the original RAW image according to the color adjustment strategy, or the intermediate RAW image obtained after processing the original RAW image according to the color adjustment strategy and the image enhancement strategy in sequence may be used as a to-be-processed image.

It is to be noted that an order between the image processing strategies used in the above examples may be transposed as desired. For instance, firstly, an image enhancement strategy is used for an original RAW image, then the obtained intermediate RAW image is used as a to-be-processed image, and a color adjustment strategy is used, etc.

It is to be noted that according to actual needs, one or more image processing strategies may be used for the original RAW image for processing, so as to obtain and output a target image satisfying requirements. That is, after the target image satisfying the requirements is obtained, the target image may not be processed as the to-be-processed image.

It is to be noted that the original RAW image or the intermediate RAW image may be derived from an electronic device obtaining the to-be-processed image or may be derived from other electronic devices communicatively connected with the electronic device obtaining the to-be-processed image.

S120, attribute information of the to-be-processed image is extracted.

The attribute information may be understood as information reflecting global, local and temporal features of the to-be-processed image.

In some implementation modes, the attribute information of the to-be-processed image may be extracted by an extraction model based on depth learning.

It will be appreciated that in some implementation modes, different types of attribute information may use different extraction models based on deep learning.

S130, an image processing strategy corresponding to the to-be-processed image is determined according to the attribute information.

S140, a target image is obtained by processing the to-be-processed image according to the image processing strategy.

In the examples of the disclosure, after attribute information of a to-be-processed image is determined, that is, features of the to-be-processed image is obtained, an image processing strategy may be selected according to the features of the to-be-processed image to process the to-be-processed image, so as to improve an imaging effect of the obtained target image.

By using the above method, after obtaining a to-be-processed image, attribute information of the to-be-processed image may be extracted first, then an image processing strategy corresponding to the to-be-processed image may be determined according to the attribute information, and finally the to-be-processed image may be processed according to the image processing strategy, to obtain a target image. Since the image processing strategy may be selected according to features of the to-be-processed image to process the to-be-processed image, compared with the related art of using a unified image processing strategy for processing different images, an imaging effect of the obtained target image may be improved.

It is to be noted that the above image processing method may be used in each processing stage of processing an original RAW image into a RAW image satisfying requirements. In this case, the extracted attribute information of the to-be-processed image may be attribute information corresponding to each stage, and thus according to the attribute information, the determined image processing strategy corresponding to the to-be-processed image may be an image processing strategy for the stage. For instance, in a color adjustment stage, attribute information corresponding to the color adjustment stage may be obtained, and a corresponding color adjustment strategy may be determined further according to the attribute information corresponding to the color adjustment stage. For another instance, in an image enhancement stage, attribute information corresponding to the image enhancement stage may be obtained, and a corresponding image enhancement strategy may be determined further according to the attribute information corresponding to the image enhancement stage.

Moreover, the above image processing method may also be used in an overall process of processing an original RAW image into a RAW image satisfying requirements. In this case, the extracted attribute information of the to-be-processed image may be a set of attribute information corresponding to each stage, and thus according to the attribute information, the determined image processing strategy corresponding to the to-be-processed image may be a set of image processing strategies respectively corresponding to the attribute information in the set. For instance, attribute information corresponding to a color adjustment stage and attribute information corresponding to an image enhancement stage may be obtained at one time, a corresponding color adjustment strategy and image enhancement strategy may be further determined according to the attribute information of the color adjustment stage and the attribute information of the image enhancement stage, and finally a to-be-processed image may be processed according to the color adjustment strategy and the image enhancement strategy separately so as to obtain a target image satisfying requirements.

In conjunction with the foregoing, it can be seen that there may be different attribute information corresponding to different stages of processing the original RAW image. In some examples, the attribute information of the to-be-processed image may include a global semantic attribute of the to-be-processed image, a temporal semantic attribute of the to-be-processed image, a local semantic attribute of each image region in the to-be-processed image, alignment difficulty of each to-be-aligned image region in the to-be-processed image, an aligned image region, etc.

In some examples, a global semantic attribute of the to-be-processed image may be selected for a color adjustment stage. Thus, in some implementation modes, the attribute information of the to-be-processed image includes a global semantic attribute of the to-be-processed image. In this case, the step that an image processing strategy corresponding to the to-be-processed image is determined according to the attribute information includes:
   a first scene context corresponding to the to-be-processed image is determined at least according to the global semantic attribute of the to-be-processed image; and a first color adjustment strategy corresponding to the first scene context is obtained.

In this case, the step that a target image is obtained by processing the to-be-processed image according to the image processing strategy includes:
   the target image is obtained by performing color adjustment to the to-be-processed image according to the first color adjustment strategy.

The first color adjustment strategy may be understood as a color adjustment strategy corresponding to the first scene context.

The global semantic attribute may be understood as the information of the actual language meaning expressed on a certain image as a whole. For instance, the global semantic attributes include rainy days, city streets, only few street lights, the absence of pedestrians, etc.

A scene context may be understood as further expressing deeper information of a photographed scene. For instance, by the global semantic attributes with rainy days, city streets, only few street lights, and the absence of pedestrians, a scene context of depression, coldness, darkness, and isolation may be portrayed.

A first scene context corresponding to the to-be-processed image may be determined in a plurality of modes at least according to the global semantic attribute of the to-be-processed image.

In some implementation modes, the step that a first scene context corresponding to the to-be-processed image is determined at least according to the global semantic attribute of the to-be-processed image includes:
   a first scene context corresponding to the to-be-processed image is determined according to the global semantic attribute of the to-be-processed image; and alternatively, the first scene context corresponding to the to-be-processed image is determined according to the global semantic attribute of the to-be-processed image and a global semantic attribute of a preset number of an image adjacent to the to-be-processed image.

In the example of the disclosure, for a single-frame or multi-frame scene, a first scene context corresponding to the to-be-processed image may be determined according to the global semantic attribute of the to-be-processed image alone.

Moreover, in addition to the fact that a first scene context corresponding to the to-be-processed image may be determined according to the global semantic attribute of the to-be-processed image alone, for the multi-frame scene, the first scene context corresponding to the to-be-processed image may be determined according to the global semantic attribute of the to-be-processed image and a global semantic attribute of a preset number of an image adjacent to the to-be-processed image.

The preset number of the image adjacent to the to-be-processed image may be an image located before the to-be-processed image in a video frame sequence, or may be an image located after the to-be-processed image in the video frame sequence, and may also include images located before and after the to-be-processed image in the video frame sequence.

Illustratively, the to-be-processed image is located at the fifth frame in the video frame sequence, the global semantic attributes of the first frame to the ninth frame in the video frame sequence may be obtained separately, and the global semantic attributes of the nine frames are integrated and purified to obtain a first scene context corresponding to the nine frames jointly. Alternatively, a first scene context of the fifth frame may be determined from respective global semantic attributes of the first frame to the ninth frame by integrating and purifying the global semantic attributes of the nine frames, while a first scene context of the sixth frame may be determined from the respective global semantic attributes of the second frame to tenth frame by integrating and purifying the global semantic attributes of the nine frames.

In the example of the disclosure, the first scene context corresponding to the to-be-processed image is determined according to the global semantic attribute of the to-be-processed image and a global semantic attribute of a preset number of an image adjacent to the to-be-processed image, such that an accidental error between single images may be eliminated, so as to improve accuracy of the determined first scene context corresponding to the to-be-processed image.

In some implementation modes, the first color adjustment strategy may be a color correction model trained based on deep learning.

In this case, an incidence relation between the first scene context and a key parameter of the color correction model may be established in advance, then after the corresponding first scene context is determined, a corresponding parameter of the color correction model may be obtained according to the incidence relation, so as to obtain a target image by performing color adjustment to the to-be-processed image based on the color correction model under the parameter.

Moreover, incidence relations between the first scene context and different color correction models may be established in advance, then after the corresponding first scene context is determined, and the corresponding color correction models may be obtained according to the incidence relations, so as to obtain a target image by performing color adjustment to the to-be-processed image based on the color correction models.

In some examples, a global semantic attribute of the to-be-processed image and a temporal semantic attribute of the to-be-processed image may be selected for the color adjustment stage. Thus, in some implementation modes, the attribute information of the to-be-processed image includes a global semantic attribute and a temporal semantic attribute of the to-be-processed image. In this case, the step that an image processing strategy corresponding to the to-be-processed image is determined according to the attribute information includes:

A second scene context corresponding to the to-be-processed image is determined according to the global semantic attribute and the temporal semantic attribute of the to-be-processed image; and a second color adjustment strategy corresponding to the second scene context is obtained.

In this case, the step that a target image is obtained by processing the to-be-processed image according to the image processing strategy includes:

the target image is obtained by performing color adjustment to the to-be-processed image according to the second color adjustment strategy.

The second color adjustment strategy may be understood as a color adjustment strategy corresponding to the second scene context.

The temporal semantic attribute of the to-be-processed image is determined according to the preset number of the image adjacent to the to-be-processed image in the video frame sequence.

The temporal semantic attribute may be understood as information of the actual language meaning expressed in terms of a data stream timing of a certain image. The data stream timing refers to a sequence between the certain image and a preset number of an adjacent image. For instance, under the condition that a basketball exists in a certain image, a semantic meaning of one basketball may be obtained merely without considering the data stream timing, and under the condition that the data stream timing between the image and other adjacent images is considered, a semantic meaning of a shooting action may be obtained. The semantic meaning of shooting is a temporal semantic attribute.

Thus, in the example of the disclosure, when the second scene context corresponding to the to-be-processed image is determined, the global semantic attribute and the temporal semantic attribute of the to-be-processed image may also be considered, so as to make the determined second scene context richer and more accurate.

In the example of the disclosure, a process of obtaining the second color adjustment strategy corresponding to the second scene context is similar to the process of obtaining the first color adjustment strategy corresponding to the first scene context in the previous example. The process of obtaining the target image by performing color adjustment to of the to-be-processed image according to the second color adjustment strategy is similar to the process of obtaining the target image by performing color adjustment to the to-be-processed image according to the first color adjustment strategy in the previous example. Reference may be made to the previous example for similar parts, which will not be repeated herein.

In some examples, a local semantic attribute of each image region in the to-be-processed image may be selected for the image enhancement stage. Thus, in some implementation modes, the attribute information of the to-be-processed image includes a local semantic attribute of each image region in the to-be-processed image. In this case, the step that an image processing strategy corresponding to the to-be-processed image is determined according to the attribute information includes:

a target image enhancement strategy corresponding to each image region is determined according to the local semantic attribute of each image region.

In this case, the step that a target image is obtained by processing the to-be-processed image according to the image processing strategy includes:

an enhanced image corresponding to each image region is obtained by performing image enhancement on each image region according to the target image enhancement strategy corresponding to each image region; and the target image is obtained by splicing the enhanced images corresponding to the image regions.

The local semantic attribute may be understood as a semantic attribute of a local region in the image. For instance, the local semantic attributes include at least one attribute type of noise intensity, detail richness, brightness, and edge sharpness. Moreover, there may be a specific attribute state corresponding to each type of attribute. For instance, noise intensity is high or low, brightness is high or low, etc.

In the example of the disclosure, in consideration of the fact that different image regions in one image may have different specific attribute state under one attribute type, such that a targeted image enhancement strategy may be used for different attribute state under one attribute type to improve the imaging effect.

That is, the target image enhancement strategy corresponding to each image region may be used to perform image enhancement on each image region to obtain an enhanced image corresponding to each image region. Since the enhanced image corresponding to each image region is obtained, the enhanced images corresponding to the image regions may be further spliced to obtain the target image.

For instance, in some implementation modes, the local semantic attributes may include three attribute types of brightness, noise intensity, and edge sharpness. As for the attribute type of noise intensity, the noise intensity of region 1 in the to-be-processed image may be high, such that a powerful denoising strategy is needed. However, for region 2, the noise intensity may be relatively low, and under the condition that the same powerful denoising strategy is used, details in the region will be erased as noise, such that a slightly weaker denoising strategy with strong ability of maintaining the details is needed.

Similarly, for the attribute type of brightness, the brightness of region 3 in the to-be-processed image may be low, such that a powerful brightness adjustment strategy is needed. However, for region 4, the brightness may be relatively high, such that a slightly weaker brightness adjustment strategy may be employed.

Similarly, for the attribute type of edge sharpness, the edge sharpness of region 5 in the to-be-processed image may be high, such that a strong sharpening strategy is needed. However, for region 6, the edge sharpness may be relatively low, such that a slightly weaker sharpening strategy may be employed.

It is to be noted that aforementioned region 1, region 3, and region 5 may be one region in the to-be-processed image, or may be different regions in the to-be-processed image. Similarly, aforementioned region 2, region 4, and region 6 may be one region in the to-be-processed image, or may be different regions in the to-be-processed image. In addition, in a practical situation, more regions may be obtained by division.

In conjunction with the foregoing, the division of regions in the to-be-processed image may be inconsistent correspondingly under different attribute types, and thus, in some implementation modes, when the local semantic attributes include a plurality of attribute types, the above method may be performed for each attribute type in sequence.

Illustratively, for the attribute type of noise intensity, a local semantic attribute under the attribute type of noise intensity corresponding to each image region in a to-be-processed image may be obtained firstly, a denoising strategy corresponding to each image region is determined, then each image region is denoised by using the denoising strategy corresponding to each image region to obtain a denoised image corresponding to each image region, and then the denoised images corresponding to the image regions are spliced to obtain a denoised image.

Further, for the attribute type of brightness, a local semantic attribute under the attribute type of brightness, of each image region in the denoised intermediate image is obtained firstly, a brightness adjustment strategy corresponding to each image region is determined, then brightness of each image region is adjusted by using the brightness adjustment strategy corresponding to each image region to obtain a brightness-adjusted image corresponding to each image region, and then the brightness-adjusted images corresponding to the image regions are spliced to obtain a brightness-adjusted image.

Further, for the attribute type of edge sharpness, a local semantic attribute under the attribute type of edge sharpness, of each image region in the denoised intermediate image is obtained firstly, a sharpening strategy corresponding to each image region is determined, then each image region is sharpened by using the sharpening strategy corresponding to each image region to obtain a sharpened image corresponding to each image region, and then the sharpened images corresponding to the image regions are spliced to obtain a sharpened image.

It is to be noted that in the above process, the sequence of denoising processing, brightness adjustment processing and sharpening processing may be replaced as required.

In some implementation modes, a semantic region segmentation model trained based on deep learning may be used to obtain a local semantic attribute of each image region in a to-be-processed image. In some examples, the semantic region segmentation model may include a semantic region segmentation model for noise intensity, a semantic region segmentation model for brightness, a semantic region segmentation model for edge sharpness, etc.

In some implementation modes, the target image enhancement strategy may also be an image enhancement model trained based on deep learning.

In some implementation modes, the image enhancement model may be, for instance, a denoising model, a brightness adjustment model, a sharpening model, etc.

In some implementation modes, for a local semantic attribute of a certain attribute type, an incidence relation between the local semantic attribute and a key parameter of an image enhancement model corresponding to the attribute type may be established in advance, such that after the local semantic attribute of each image region is determined, a parameter of the corresponding image enhancement model is obtained, so as to perform image enhancement on the corresponding image region based on the image enhancement models under the parameter, and then an enhanced image corresponding to each image region is obtained.

Moreover, incidence relations between the local semantic attribute of a certain attribute type and different image enhancement models corresponding to the attribute type may be established in advance, such that after the local semantic attribute of each corresponding image region is determined, the corresponding image enhancement models may be obtained according to the incidence relations, so as to perform image enhancement on the corresponding image regions based on the image enhancement models, and then an enhanced image corresponding to each image region is obtained.

It is understandable that for some image imaging processes, for instance, an imaging process of video shooting, an image alignment and fusion process for improving inter-frame stability needs to be additionally arranged, an alignment strategy based on deep learning has a better alignment effect, but its speed is low, and real-time processing requirements may not be met at some times. Thus, in order to satisfy a requirement for real-time processing while an alignment effect is improved, in some implementation modes, in an image alignment stage, the attribute information of the to-be-processed image may include alignment difficulty of each to-be-aligned image region and aligned image regions in the to-be-processed image. Thus, in some implementation modes, the attribute information of the to-be-processed image may include alignment difficulty of each to-be-aligned image region and aligned image regions in the to-be-processed image. In this case, the step that an image processing strategy corresponding to the to-be-processed image is determined according to the attribute information includes:

a target image alignment strategy corresponding to each to-be-aligned image region is determined according to the alignment difficulty of each to-be-aligned image region.

In this case, the step that a target image is obtained by processing the to-be-processed image according to the image processing strategy includes:

a pixel corresponding relation between each corresponding to-be-aligned image regions in the to-be-processed image and a candidate image is obtained by aligning the each corresponding to-be-aligned image regions according to the target image alignment strategy corresponding to each to-be-aligned image region;

a fused image of each to-be-aligned image region in the to-be-processed image is obtained by fusing each corresponding to-be-aligned image regions according to a preset fusion strategy and the pixel corresponding relation between each corresponding to-be-aligned image regions;

a fused image of each aligned image region in the to-be-processed image is obtained by fusing the aligned image regions corresponding to each other in the to-be-processed image and the candidate image according to the preset fusion strategy; and the target image is obtained by splicing the fused image of each to-be-aligned image region in the to-be-processed image and the fused image of each aligned image region in the to-be-processed image.

In two adjacent images, a moving region is an image region that needs to be aligned and may be referred to as a to-be-aligned image region, and a still region is an image region that does not need to be aligned and may be referred to as an aligned image region, that is understood as an already aligned image region.

In some implementation modes, moving regions and still regions in a to-be-processed image and one image adjacent to the to-be-processed image may be detected by means of a local motion detection model trained based on deep learning. For instance, the to-be-processed image and the previous image adjacent to the to-be-processed image may be input into the local motion detection model to obtain each corresponding moving regions and each corresponding still regions in the two images.

In some implementation modes, after a moving region is obtained and used as a to-be-aligned image region, alignment difficulty of each to-be-aligned image region may be further classified by means of an alignment difficulty classification model trained based on deep learning. For instance, the alignment difficulty may be classified into two types of difficult alignment and easy alignment.

Thus, by means of the above process, the alignment difficulty of each to-be-aligned image region and aligned image regions in the to-be-processed image may be obtained.

In some implementation modes, incidence relations between the alignment difficulty and different alignment strategies may be established in advance, such that after the alignment difficulty of each to-be-aligned region is determined, a target image alignment strategy corresponding to each to-be-aligned region may be obtained according to the alignment difficulty of each to-be-aligned region.

In some implementation modes, different image alignment strategies have different alignment speeds. Illustratively, the image alignment strategies may include a deep-learning-based alignment strategy and a traditional alignment strategy. The traditional alignment strategy may be, for example, a Homograph algorithm for global alignment or an optical flow method for pixel-by-pixel alignment, etc.

Illustratively, assuming that a to-be-processed image has to-be-aligned image region 1 and to-be-aligned image region 2, alignment difficulty of to-be-aligned image region 1 is large, alignment difficulty of to-be-aligned image region 2 is small, and in this case, a determined target image alignment strategy corresponding to to-be-aligned image region 1 may be an alignment strategy based on deep learning, and a determined target image alignment strategy corresponding to the to-be-aligned image region 2 may be a traditional alignment strategy.

In the example of the disclosure, after the target alignment strategy corresponding to each to-be-aligned image region is determined, a pixel corresponding relation between each corresponding to-be-aligned image regions in the to-be-processed image and a candidate image may be obtained by aligning the corresponding to-be-aligned image regions according to the target image alignment strategy corresponding to each to-be-aligned image region. The candidate image may be the foregoing image input into the local motion detection model together with the to-be-processed image, for instance, a previous image adjacent to the to-be-processed image in a video frame or a next image adjacent to the to-be-processed image in the video frame.

In some implementation modes, fusion processing may be performed by summing and averaging each corresponding pixels. For instance, two pixels corresponding to each other in the two adjacent images are weighted to obtain an average value, then the average value is taken as an actual value of the pixel in the to-be-processed image, and then a fused image of each to-be-aligned image region in the to-be-processed image and a fused image of each aligned image region in the to-be-processed image are obtained.

In some implementation modes, a weight value may be 1:1. In some other implementation modes, considering that the to-be-processed image is imaged, further reference may be made to the pixels of the to-be-processed image, and thus, a weight of the to-be-processed image may be set larger, while a weight of the candidate image may be set smaller, for example, a weight ration of the to-be-processed image to the candidate image is set to be 1.5:1.

Finally, the target image may be obtained by splicing the fused image of each to-be-aligned image region t in the to-be-processed image and the fused image of each aligned image region in the to-be-processed image.

Illustratively, assuming that there are N adjacent image frames in the video frames, that is, a first image, a second image, . . . , an Nth image, when the first image is received, the first image may be cached since there is one image.

When the second image is received, the second image may be used as a to-be-processed image, and the first image may be used as a candidate image. In this case, the first image and the second image may be input into the local motion detection model to detect moving regions and still regions in the first image and the second image. Assuming that image regions where a puppy runs, image regions where a person walks and image regions of a static building are detected in the first image and the second image, the image regions where the puppy runs and the image regions where the person walks may be determined as to-be-aligned image regions, and the image regions with the static building may be determined as aligned image regions.

Further, the image region where the puppy runs and the image region where the person walks in the second image then are input into the alignment difficulty classification model. Assuming that it may be obtained that alignment difficulty of the image region where the puppy runs is large and alignment difficulty of the image region where the person walks is small, an alignment strategy based on deep learning may be used to align the image region where the puppy runs in the first image with the image region where the puppy runs in the second image, such that a pixel corresponding relation between the two image regions where the puppy runs is obtained; and a traditional alignment strategy may be used to align the image region where the person walks in the first image with the image region where the people walk in the second image to obtain a pixel corresponding relation between the two image regions where the person walks.

Then, fusion may be further performed according to a preset weight relation and the pixel corresponding relation of the image regions where the puppy runs in the two images to obtain a fused image of the image regions where the puppy runs. Fusion may be performed according to a preset weight relation and the pixel corresponding relation of the image regions where the person walks in the two images to obtain a fused image of the image regions where person walks. Fusion may be performed according to a preset weight relation and a pixel corresponding relation of the image regions of the static building in the two images to obtain a fused image of the image regions of the static building.

That is, the image region where the puppy runs in the first image and the image region where the puppy runs in the second image may be understood as a pair of corresponding to-be-aligned image regions, and the image region where the person walks in the first image and the image region where the person walks in the second image may be understood as another pair of corresponding to-be-aligned image regions. The image region of the static building in the first image and the image region of the static building in the second image may be understood as a pair of corresponding aligned image regions.

When the third image is received, the third image may be used as a to-be-processed image and the second image may be used as a candidate image, or when the Nth image is received, the Nth image may be used as a to-be-processed image and the (N−1)th image may be used as a candidate image. After the to-be-processed image and the candidate image are determined, reference may be made to the foregoing for a process of determining a target image alignment strategy corresponding to each to-be-aligned image region in the to-be-processed image, and performing processing according to the target image alignment strategy and a preset fusion strategy, which will not be repeated herein.

In the example of the disclosure, dynamic alignment strategy adjustment may be performed according to different alignment difficulty of different image regions of the to-be-processed image, so as to balance an alignment effect and an alignment speed, redundant operation may be avoided under the condition that an alignment requirement is met, and the entire solution is efficient and rapid.

Moreover, considering that there are a certain number of deep-learning-based models in the example of the disclosure, in some implementation modes, a model architecture search technique may be used to simplify a structure of a neural network model, and quantification, distillation, cropping, etc. are further used to optimize a processing speed. Reference may be made to the related art for the above optimization process, which will not be repeated herein.

Moreover, considering that the ISP system in the related art may process an image well and the image processing effect is poor in some special scenes, for example, night scenes, rainy scenes, etc., in some implementation modes, the image processing method in the example of the disclosure may be started in the night scenes or the rainy scenes, so as to improve an imaging effect.

Thus, in some implementation modes, the electronic device may respond to trigger operation of a user to start the image processing method in the example of the disclosure to execute the steps of S110-S140 in a night scene, a rainy scene, etc.

In some other implementation modes, the electronic device may detect that an environment is a special scene of the night scene or the rainy scene, such that the image processing method in the example of the disclosure is automatically started to execute the steps of S110-S140.

The image processing method in the example of the disclosure is described below as an exemplary illustration of a complete night video photographing scene.

Figure 2:
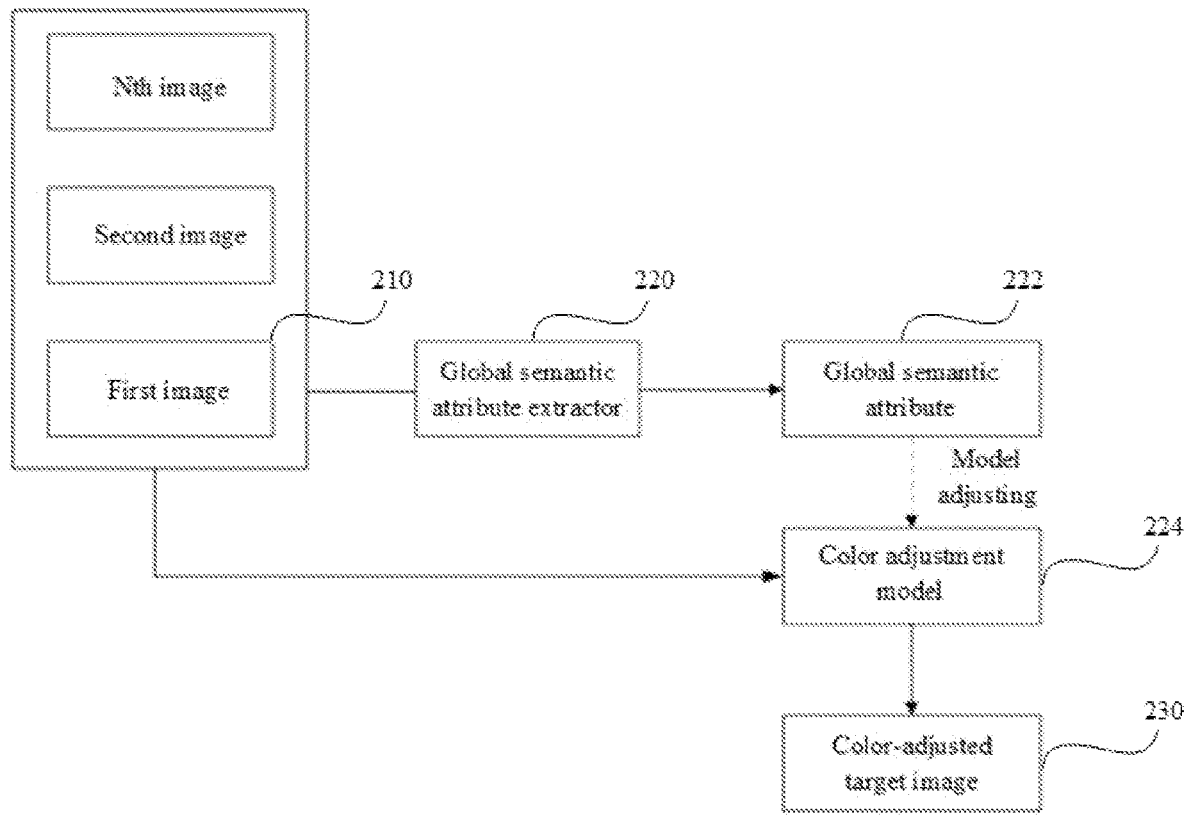
FIG. 2 is a block diagram of a color adjustment stage according to an example.

When a video is photographed at night, the electronic device may automatically use the image processing method in the example of the disclosure. An image sensor may continuously collect a video frame sequence, that is, a plurality of RAW images. After a first image is collected, the first image may be used as a to-be-processed image to be input into an image processing apparatus. In the image processing apparatus, as shown in FIG. 2, a global semantic attribute of the to-be-processed first image 210 may be extracted by using a global semantic attribute extractor 220 trained based on deep learning, then a color adjustment model 224 corresponding to the to-be-processed image is determined according to the global semantic attribute 222 of the to-be-processed image, and a color of the to-be-processed image 210 is adjusted by using the determined color adjustment model 224 to obtain a color-adjusted target image 230.

Figure 3:
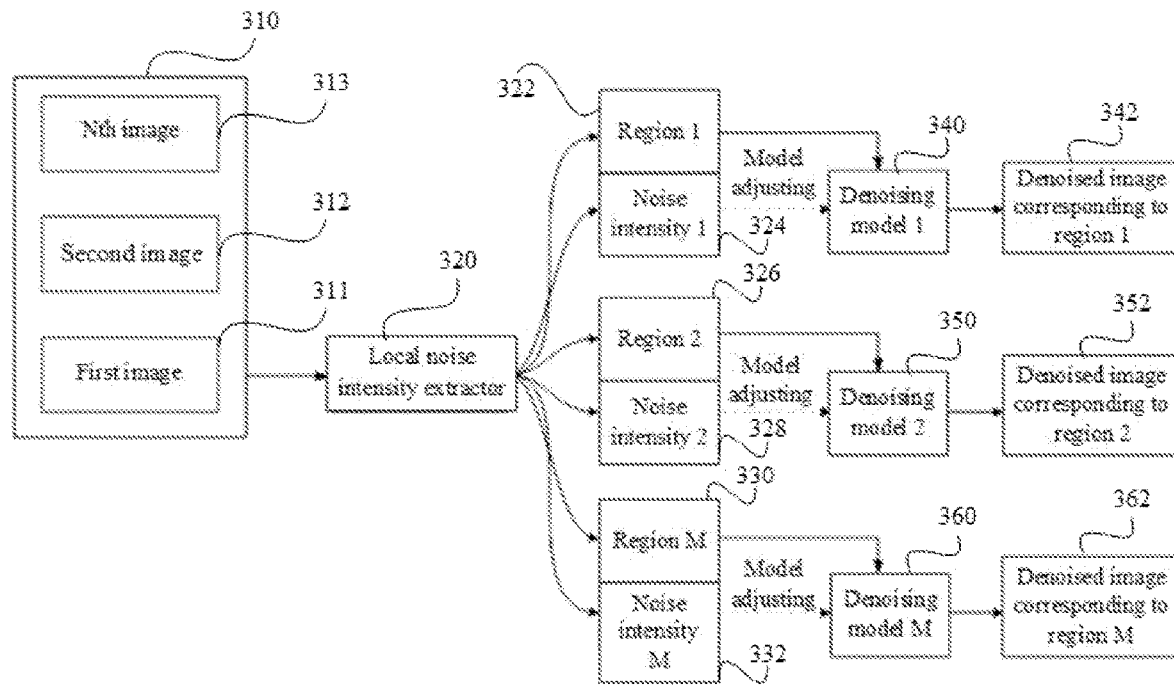
FIG. 3 is a block diagram of an image enhancement stage according to an example.

After the color-adjusted target image 310 including the to-be-processed first image 311, the to-be-processed second image 312 and the to-be-processed Nth image 313 is obtained, as shown in FIG. 3, the image processing apparatus may take the color-adjusted target image as a to-be-processed image, use a local noise intensity extractor 320 based on deep learning to extract noise intensity of each image region in the to-be-processed image (for instance, as shown in FIG. 3, region 1 322 corresponds to noise intensity 1 324, region 2 326 corresponds to noise intensity 2 328, and region M 330 corresponds to noise intensity M 332), then determine a denoising model corresponding to each image region (for instance, as shown in FIG. 3, region 1 corresponds to denoising model 1 340, region 2 corresponds to denoising model 2 350, and region M corresponds to denoising model M 360) according to the noise intensity of each image region, and denoise each region in the to-be-processed image by using the determined denoising model to obtain a denoised intermediate image corresponding to each region, i.e. denoised image corresponding to region 1 342, denoised image corresponding to region 2 352 and denoised image corresponding to region M 362.

Further, brightness of each image region in the to-be-processed image is extracted by using a local brightness extractor based on deep learning, a brightness adjustment model corresponding to each image region is determined according to the brightness of each image region, brightness of the to-be-processed image is adjusted by using the determined brightness adjustment models, and a brightness-adjusted intermediate image is obtained.

Then, a sharpening degree of each image region in the to-be-processed image is extracted by using a local edge sharpening degree extractor based on deep learning, a sharpening model corresponding to each image region is determined according to the sharpening degree of each image region, the to-be-processed image is sharpened by using the determined sharpening models, and a sharpened target image, that is, a first target image after image enhancement is obtained.

In this case, the first image may be cached to wait for the second image collected by the image sensor to complete the color adjustment and image enhancement processes. After the second image completes the color adjustment and image enhancement processes, a second target image after image enhancement may be obtained.

Figure 4:
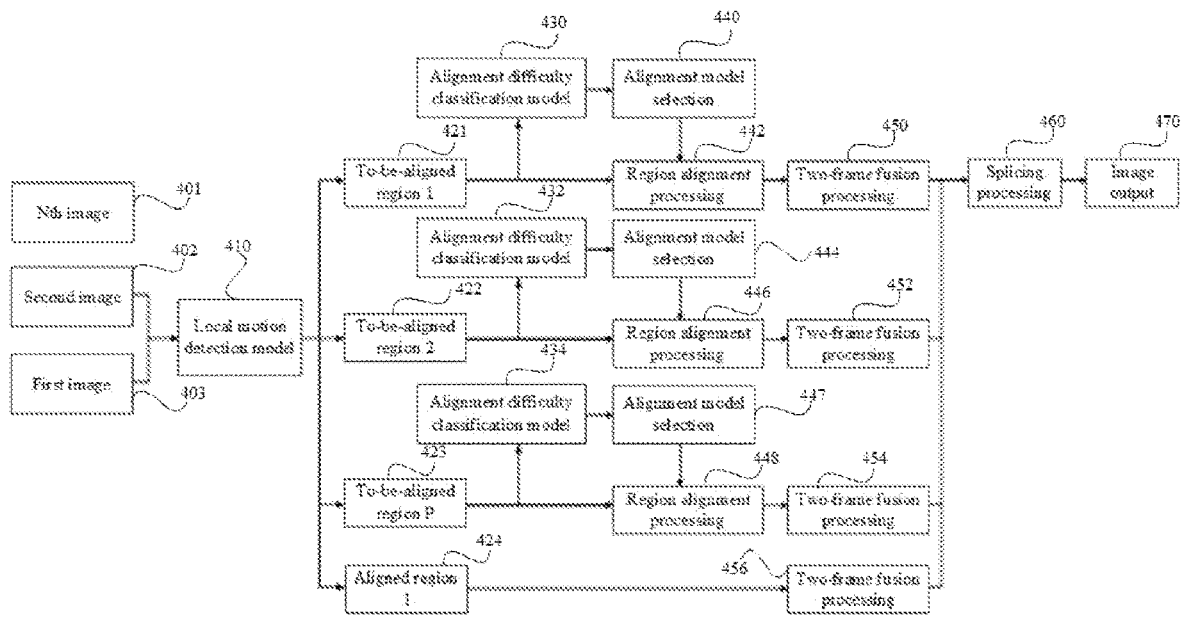
FIG. 4 is a block diagram of an alignment and fusion stage according to an example.

After the first target image 403 and the second target image 402 are obtained, as shown in FIG. 4, the first target image 403 is used as a candidate image and the second target image 402 is used as a to-be-processed image are input into a local motion detection model 410 based on deep learning, so as to detect a moving region (for instance, to-be-aligned region 1 421, to-be-aligned region 2 422 and to-be-aligned region P 423 as shown in FIG. 4) and a static region (aligned region 1 424) in the to-be-processed image 402 and the candidate image 403.

After the moving region is obtained and used as a to-be-aligned image region, as shown in FIG. 4, alignment difficulty of each to-be-aligned image region in the to-be-processed image may be further classified by means of an alignment difficulty classification model (430, 432, 434) trained based on deep learning, so as to obtain the alignment difficulty of each to-be-aligned image region in the to-be-processed image.

Then, as shown in FIG. 4, a target image alignment model (440, 444, 447) corresponding to each to-be-aligned region is further obtained according to the alignment difficulty of each to-be-aligned region (421, 422, 423), and a pixel corresponding relation between each pair of corresponding to-be-aligned image regions in the to-be-processed image and a candidate image is obtained by aligning (442, 446, 448) the corresponding to-be-aligned image regions according to the target image alignment model corresponding to each to-be-aligned image region.

Then, as shown in FIG. 4, a fused image of each to-be-aligned image region in the to-be-processed image is obtained by fusing each pair of corresponding to-be-aligned image regions according to a preset fusion strategy and the pixel corresponding relation between each pair of corresponding to-be-aligned image regions, and a fused image of each aligned image region in the to-be-processed image is obtained by fusing (450, 452, 454, 456) the aligned image regions corresponding to each other in the to-be-processed image and the candidate image according to the preset fusion strategy.

Finally, as shown in FIG. 4, the target image 470 may be obtained by splicing 460 the fused image of each to-be-aligned image region in the to-be-processed image and the fused image of each aligned image region in the to-be-processed image, and the target image is output.

Thus, a complete image processing process of the first image and the second image in the video frame sequence is completed. Subsequently, for a third image, color adjustment processing and image enhancement processing may be performed according to the foregoing method, after image enhancement processing, a target image obtained after performing enhancement processing on the third image may be used as a to-be-processed image, the target image obtained after performing image enhancement processing on the second image is selected as a candidate image, and interframe stability processing is performed to obtain and output a target image corresponding to the third image.

It is understandable that reference may be made to the above processes for processing methods of the fourth image, the fifth image, and the Nth image 401, and will not be repeated herein.

Thus, after the Nth image 401 is processed to obtain a target image, the entire video frame sequence after image processing may be obtained.

Figure 5:
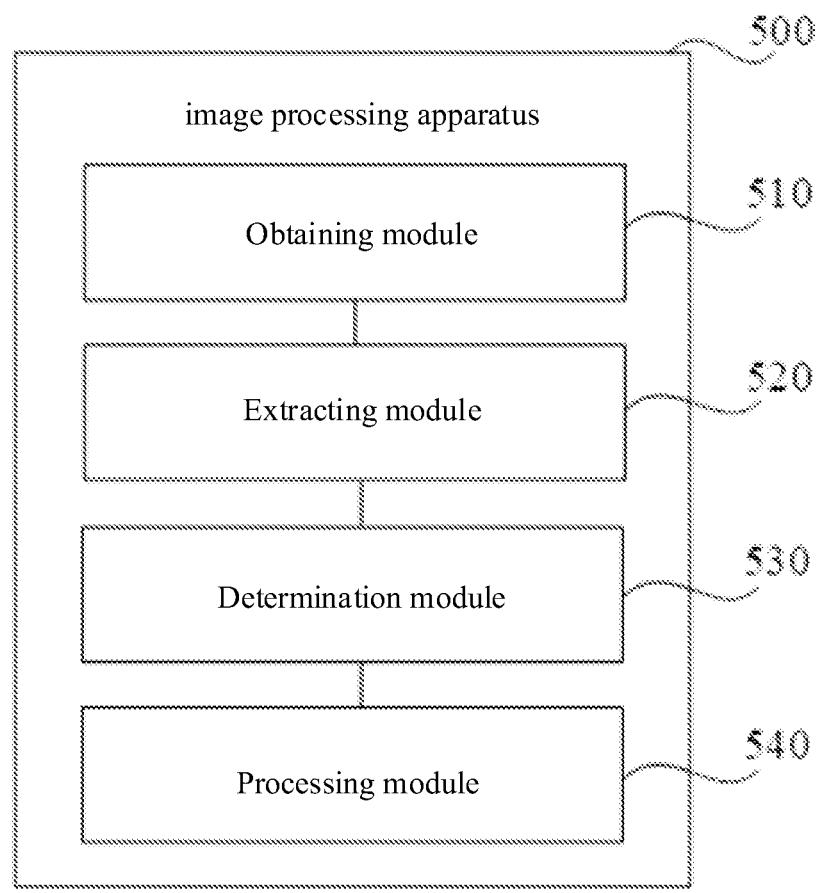
FIG. 5 is a block diagram of an image processing apparatus according to an example.

FIG. 5 is a block diagram of an image processing apparatus 500 according to an example. With reference to FIG. 5, the apparatus 500 includes an obtaining module 510, an extracting module 520, a determination module 530 and a processing module 540.

The obtaining module 510 is configured to obtain a to-be-processed image.

The extracting module 520 is configured to extract attribute information of the to-be-processed image.

The determination module 530 is configured to determine an image processing strategy corresponding to the to-be-processed image according to the attribute information.

The processing module 540 is configured to obtain a target image by processing the to-be-processed image according to the image processing strategy.

In some implementation modes, the attribute information of the to-be-processed image includes a global semantic attribute of the to-be-processed image, and the determination module 530 includes:
  a first context determination submodule configured to determine a first scene context corresponding to the to-be-processed image at least according to the global semantic attribute of the to-be-processed image; and
  a first obtaining submodule configured to obtain a first color adjustment strategy corresponding to the first scene context.

Correspondingly, the processing module 540 includes:
  a first color adjustment submodule configured to obtain the target image by performing color adjustment to the to-be-processed image according to the first color adjustment strategy.

In some implementations, the first context determination submodule includes:
  a first determination unit configured to determine the first scene context corresponding to the to-be-processed image according to the global semantic attribute of the to-be-processed image; and
  a second determination unit configured to determine the first scene context corresponding to the to-be-processed image according to the global semantic attribute of the to-be-processed image and a global semantic attribute of a preset number of an image adjacent to the to-be-processed image.

In some implementation modes, the attribute information of the to-be-processed image includes a global semantic attribute and a temporal semantic attribute of the to-be-processed image, the temporal semantic attribute of the to-be-processed image is determined according to a preset number of an image adjacent to the to-be-processed image, and the determination module 530 includes:
  a second scene context determination submodule configured to determine a second scene context corresponding to the to-be-processed image according to the global semantic attribute and the temporal semantic attribute of the to-be-processed image; and
  a second obtaining submodule configured to obtain a second color adjustment strategy corresponding to the second scene context.

Correspondingly, the processing module 540 includes:
  a second color adjustment submodule configured to obtain the target image by performing color adjustment to the to-be-processed image according to the second color adjustment strategy.

In some implementation modes, the attribute information of the to-be-processed image includes a local semantic attribute of each image region in the to-be-processed image, and the determination module 530 includes:
  a target image enhancement strategy determination submodule configured to determine a target image enhancement strategy corresponding to each image region according to the local semantic attribute of each image region.

Correspondingly, the processing module 540 includes:

an image enhancement submodule configured to obtain an enhanced image corresponding to each image region by performing image enhancement on each image region according to the target image enhancement strategy corresponding to each image region; and a first splicing submodule configured to obtain the target image by splicing the enhanced image corresponding to each image region.

In some implementation modes, types of the local semantic attribute include at least one attribute type of noise intensity, detail richness, brightness, and edge sharpness.

In some implementation modes, the attribute information of the to-be-processed image includes alignment difficulty of each to-be-aligned image region and aligned image regions in the to-be-processed image, and the determination module 530 includes:

a target image alignment strategy determination submodule configured to determine a target image alignment strategy corresponding to each to-be-aligned image region according to the alignment difficulty of each to-be-aligned image region.

Correspondingly, the processing module 540 includes:

an alignment submodule configured to obtain a pixel corresponding relation between corresponding to-be-aligned image regions in the to-be-processed image and a candidate image by aligning the corresponding to-be-aligned image regions according to the target image alignment strategy corresponding to each to-be-aligned image region, where the candidate image is adjacent to the to-be-processed image;

a first fusion submodule configured to obtain a fused image of each to-be-aligned image region in the to-be-processed image by fusing corresponding to-be-aligned image regions according to a preset fusion strategy and the pixel corresponding relation between corresponding to-be-aligned image regions;

a second fusion submodule configured to obtain a fused image of each aligned image region in the to-be-processed image by fusing the aligned image regions corresponding to each other in the to-be-processed image and the candidate image according to the preset fusion strategy; and a second splicing submodule configured to obtain the target image by splicing the fused image of each to-be-aligned image region in the to-be-processed image and the fused image of each aligned image region in the to-be-processed image.

With respect to the apparatus in the above example, specific ways in which the various modules perform operations have been described in detail in the examples relating to the method, and will not be described in detail herein.

The disclosure further provides a computer-readable storage medium. The computer-readable storage medium stores a computer program instruction, where when executed by a processor, the program instruction implements steps of the image processing method provided in the disclosure.

Figure 6:
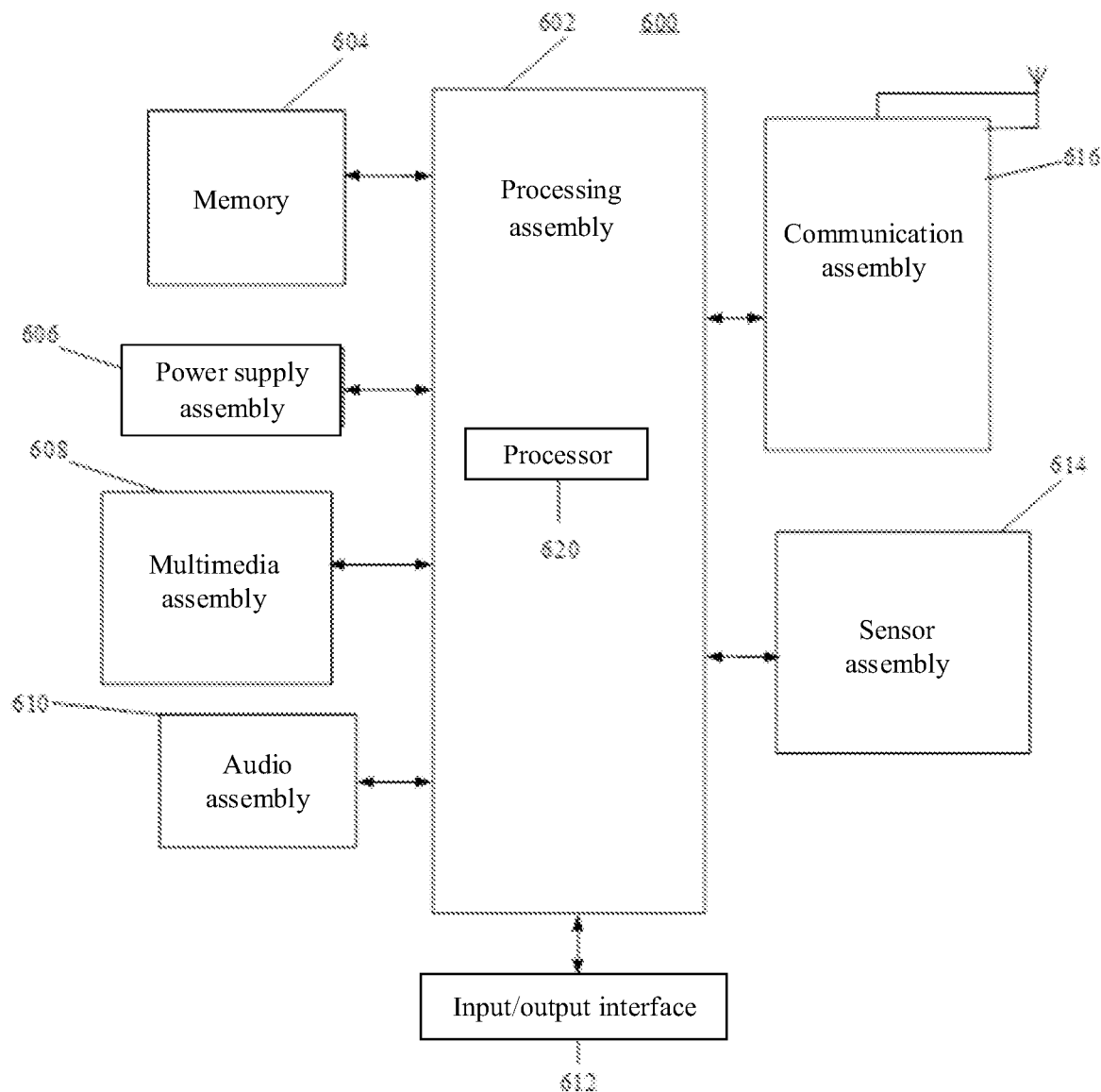
FIG. 6 is a schematic structural diagram of an electronic device according to an example.

FIG. 6 is a block diagram of an electronic device 600 according to an example. For instance, the electronic device 600 may be a mobile phone, a computer, a digital broadcast terminal, a messaging device, a gaming console, a tablet device, a medical device, a fitness device, a personal digital assistant, etc.

With reference to FIG. 6, the electronic device 600 may include one or more of a processing assembly 602, a memory 604, a power supply assembly 606, a multimedia assembly 608, an audio assembly 610, an input/output interface 612, a sensor assembly 614, and a communication assembly 616.

The processing assembly 602 generally controls overall operation of the electronic device 600, for instance, operations associated with display, phone calls, data communications, camera operations, and recording operations. The processing assembly 602 may include one or more processors 620 to execute an instruction to complete all or part of the steps of the method above. Moreover, the processing assembly 602 may include one or more modules to facilitate interaction between the processing assembly 602 and other assemblies. For instance, the processing assembly 602 may include the multimedia module to facilitate interaction between the multimedia assembly 608 and the processing assembly 602.

The memory 604 is configured to store various types of data to support operation on the electronic device 600. Instances of such data include an instruction, operated on the electronic device 600, for any application or method, contact data, phonebook data, messages, pictures, video, etc. The memory 604 may be implemented by any type of volatile or non-volatile memory apparatus, or their combination, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 606 provides power to the various assemblies of the electronic device 600. The power supply assembly 606 may include a power management system, one or more power supplies, and other assemblies associated with power generation, management, and distribution for the electronic device 600.

The multimedia assembly 608 includes a screen that provides an output interface between the electronic device 600 and the user. In some examples, the screen may include a liquid crystal display (LCD) and a touch panel (TP). Under the condition that the screen includes the touch panel, the screen may be implemented as a touch screen to receive an input signal from the user. The touch panel includes one or more touch sensors to sense touches, slides, and gestures on the touch panel. The touch sensor may not only sense a boundary of a touch or slide action, but also detect duration and pressure related to the touch or slide operation. In some examples, the multimedia assembly 608 includes a front-facing camera and/or a rear-facing camera. When the electronic device 600 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 610 is configured to output and/or input an audio signal. For instance, the audio assembly 610 includes a microphone (MIC) configured to receive an external audio signal when the electronic device 600 is in the operational mode, for instance, a calling mode, a recording mode, and a speech recognition mode. The received audio signal may be further stored in the memory 604 or sent via the communication assembly 616. In some examples, the audio assembly 610 further includes a speaker for outputting the audio signal.

The input/output interface 612 provides an interface between the processing assembly 602 and a peripheral interface module, which may be a keyboard, a click wheel, a button, etc. These buttons may include, but are not limited to, a home button, a volume button, a start button, and a lock button.

The sensor assembly 614 includes one or more sensors for providing state assessments of various aspects for the electronic device 600. For instance, the sensor assembly 614 may detect an on/off state of the electronic device 600 and relative positioning of the assemblies. For instance, the assemblies are a display and a keypad of the electronic device 600. The sensor assembly 614 may also detect a change in position of the electronic device 600 or an assembly of the electronic device 600, the presence or absence of contact between the user and the electronic device 600, orientation or acceleration/deceleration of the electronic device 600, and temperature variation of the electronic device 600. The sensor assembly 614 may include a proximity sensor configured to detect presence of nearby objects in the absence of any physical contact. The sensor assembly 614 may also include a light sensor, for instance, a complementary metal oxide semiconductor (CMOS) or charge coupled device (CCD) image sensor, for use in imaging applications. In some examples, the sensor assembly 614 may also include an acceleration sensor, a gyroscopic sensor, a magnetic sensor, a pressure sensor, or a temperature sensor.

The communication assembly 616 is configured to facilitate communications between the electronic device 600 and other apparatuses in a wired or wireless mode. The electronic device 600 may access a wireless network based on a communication standard, for instance, WiFi, 2G, or 3G, or their combination. In an example, the communication assembly 616 receives a broadcast signal or broadcast related information from an external broadcast management system via a broadcast channel. In an example, the communication assembly 616 also includes a near field communication (NFC) module to facilitate short-range communication. For instance, the NFC module may be implemented based on a radio frequency identification (RFID) technology, an infrared data association (IrDA) technology, an ultra wide band (UWB) technology, a Bluetooth (BT) technology, and other technologies.

In an example, the electronic device 600 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for performing the method above.

In an example, further provided is a non-transitory computer-readable storage medium including an instruction, for instance, a memory 604 including an instruction, and the instruction may be executed by the processor 620 of the electronic device 600 so as to execute the method above. For instance, the non-transitory computer-readable storage medium may be a read-only memory (ROM), a random access memory (RAM), a compact disc read-only memory (CD-ROM), a magnetic tape, a floppy disk, an optical data storage apparatus, etc.

The above apparatus may be a part of a separate electronic device in addition to a separate electronic device. For instance, in one example, the apparatus may be an integrated circuit (IC) or a chip, where the integrated circuit may be an IC or a set of a plurality of ICs; and the chip may include, but is not limited to, the following categories: a graphics processing unit (GPU), a central processing unit (CPU), a field programmable gate array (FPGA), a digital signal processor (DSP), an application specific integrated circuit (ASIC), a system on chip (SOC), etc. The above integrated circuit or chip may be used to execute an executable instruction (or code) to implement the above image processing method. The executable instructions may be stored on the integrated circuit or chip or retrieved from another apparatus or device, for instance, the integrated circuit or chip includes a processor, a memory, and an interface for communication with another apparatus. The executable instruction may be stored in the memory, and when executed by a processor, the executable instruction implements the above image processing method. Alternatively, the integrated circuit or chip may receive the executable instruction by means of the interface and transmit the executable instruction to the processor for execution to implement the above image processing method.

In another example, further provided is a computer program product. The computer program product includes a computer program executable by a programmable apparatus, and the computer program has a code portion for performing the above image processing method when executed by the programmable apparatus.

Those skilled in the art will readily conceive of other examples of the disclosure upon consideration of the specification and practical disclosure. The present disclosure is intended to cover any variations, uses, or adaptations of the disclosure, and these variations, uses, or adaptations follow general principles of the disclosure and include common general knowledge or customary technical means in the technical field not disclosed in the disclosure. The specification and examples are considered as exemplary, and a true scope and spirit of the disclosure are indicated by the following claims.

It is to be understood that the disclosure is not limited to the precise structure that has been described above and shown in the accompanying drawings, and that various modifications and changes may be made without departing from its scope. The scope of the disclosure is limited merely by the appended claims.

What is claimed is:

1. An image processing method, comprising:
   obtaining a to-be-processed image,
   extracting attribute information of the to-be-processed image,
   determining an image processing strategy corresponding to the to-be-processed image according to the attribute information, and
   obtaining a target image by processing the to-be-processed image according to the image processing strategy,
   wherein the attribute information of the to-be-processed image comprises alignment difficulty of each of at least one to-be-aligned image region and an aligned image region,
   determining the image processing strategy corresponding to the to-be-processed image according to the attribute information comprises:
      determining a target image alignment strategy corresponding to each of the at least one to-be-aligned image region according to the alignment difficulty of each of the at least one to-be-aligned image region, and
   obtaining the target image by processing the to-be-processed image according to the image processing strategy comprises:
      obtaining a pixel corresponding relation between corresponding to-be-aligned image regions in the to-be-processed image and a candidate image by aligning the corresponding to-be-aligned image regions according to the target image alignment strategy, wherein the candidate image is adjacent to the to-be-processed image, obtaining a fused image of each of the at least one to-be-aligned image region by fusing the corresponding to-be-aligned image regions according to a preset fusion strategy and the pixel corresponding relation between the corresponding to-be-aligned image regions, obtaining a fused image of the aligned image region by fusing a plurality of aligned image regions corresponding to each other in the to-be-processed image and the candidate image according to the preset fusion strategy, and obtaining the target image by splicing the fused image of each of the at least one to-be-aligned image region and the fused image of the aligned image region.

2. The method according to claim 1, wherein the attribute information of the to-be-processed image comprises a global semantic attribute, and determining the image processing strategy corresponding to the to-be-processed image according to the attribute information comprises:

determining a first scene context corresponding to the to-be-processed image at least according to the global semantic attribute, and obtaining a first color adjustment strategy corresponding to the first scene context, and obtaining the target image by processing the to-be-processed image according to the image processing strategy comprises:

obtaining the target image by performing color adjustment to the to-be-processed image according to the first color adjustment strategy.

3. The method according to claim 2, wherein determining the first scene context corresponding to the to-be-processed image at least according to the global semantic attribute comprises:

determining the first scene context according to the global semantic attribute.

4. The method according to claim 2, wherein determining the first scene context corresponding to the to-be-processed image at least according to the global semantic attribute comprises:

determining the first scene context according to the global semantic attribute and a global semantic attribute of a preset number of an image adjacent to the to-be-processed image.

5. The method according to claim 1, wherein the attribute information of the to-be-processed image comprises a global semantic attribute and a temporal semantic attribute, and the temporal semantic attribute is determined according to a preset number of an image adjacent to the to-be-processed image, determining the image processing strategy corresponding to the to-be-processed image according to the attribute information comprises:

determining a second scene context corresponding to the to-be-processed image according to the global semantic attribute and the temporal semantic attribute, and obtaining a second color adjustment strategy corresponding to the second scene context, and obtaining the target image by processing the to-be-processed image according to the image processing strategy comprises:

obtaining the target image by performing color adjustment to the to-be-processed image according to the second color adjustment strategy.

6. The method according to claim 1, wherein the attribute information of the to-be-processed image comprises a local semantic attribute of each of the at least one image region, the image region comprises the at least one to-be-aligned image region, or comprises the aligned image region, determining the image processing strategy corresponding to the to-be-processed image according to the attribute information comprises:

determining a target image enhancement strategy corresponding to each of the at least one image region according to the local semantic attribute of each of the at least one image region, and obtaining the target image by processing the to-be-processed image according to the image processing strategy comprises:

obtaining an enhanced image corresponding to each of the at least one image region by performing image enhancement on each of the at least one image region according to the target image enhancement strategy, and obtaining the target image by splicing the enhanced image corresponding to each of the at least one image region.

7. The method according to claim 6, wherein types of the local semantic attribute comprise at least one attribute type of noise intensity, detail richness, brightness, or edge sharpness.

8. The method according to claim 1, wherein the to-be-processed image is an original image collected by an image sensor or a target image obtained after processing the original image according to at least one image processing strategy of a color adjustment strategy, an image enhancement strategy, or an image alignment strategy.

9. A non-transitory computer-readable storage medium, storing a computer program instruction, wherein when executed by a processor, the computer program instruction causes the processor to implement the method of claim 1.

10. A chip, comprising a processor and an interface, wherein the processor is configured to read an instruction and execute the method of claim 1.

11. An electronic device, comprising:

a memory storing a computer program; and a processor, when executing the computer program in the memory, is configured to:

obtain a to-be-processed image, extract attribute information of the to-be-processed image, determine an image processing strategy corresponding to the to-be-processed image according to the attribute information, and obtain a target image by processing the to-be-processed image according to the image processing strategy, wherein the attribute information of the to-be-processed image comprises alignment difficulty of each of at least one to-be-aligned image region and an aligned image region, and the processor is further configured to:

determine a target image alignment strategy corresponding to each of the at least one to-be-aligned image region according to the alignment difficulty of each of the at least one to-be-aligned image region, obtain a pixel corresponding relation between corresponding to-be-aligned image regions in the to-be-processed image and a candidate image by aligning the corresponding to-be-aligned image regions according to the target image alignment strategy, wherein the candidate image is adjacent to the to-be-processed image, obtain a fused image of each of the at least one to-be-aligned image region by fusing the corresponding to-be-aligned image regions according to a preset fusion strategy and the pixel corresponding relation between the corresponding to-be-aligned image regions, obtain a fused image of the aligned image region in the to-be-processed image by fusing a plurality of aligned image regions corresponding to each other in the to-be-processed image and the candidate image according to the preset fusion strategy, and obtain the target image by splicing the fused image of each of the at least one to-be-aligned image region and the fused image of the aligned image region.

12. The electronic device according to claim 11, wherein the attribute information of the to-be-processed image comprises a global semantic attribute, and
the processor is further configured to:
   determine a first scene context corresponding to the to-be-processed image at least according to the global semantic attribute,
   obtain a first color adjustment strategy corresponding to the first scene context, and
   obtain the target image by performing color adjustment to the to-be-processed image according to the first color adjustment strategy.

13. The electronic device according to claim 12, wherein the processor is further configured to:
   determine the first scene context corresponding to the to-be-processed image according to the global semantic attribute.

14. The electronic device according to claim 12, wherein the processor is further configured to:
   determine the first scene context corresponding to the to-be-processed image according to the global semantic attribute and a global semantic attribute of a preset number of an image adjacent to the to-be-processed image.

15. The electronic device according to claim 11, wherein the attribute information of the to-be-processed image comprises a global semantic attribute and a temporal semantic attribute, and the temporal semantic attribute is determined according to a preset number of an image adjacent to the to-be-processed image, and
the processor is further configured to:
   determine a second scene context corresponding to the to-be-processed image according to the global semantic attribute and the temporal semantic attribute,
   obtain a second color adjustment strategy corresponding to the second scene context, and
   obtain the target image by performing color adjustment to the to-be-processed image according to the second color adjustment strategy.

16. The electronic device according to claim 11, wherein the attribute information of the to-be-processed image comprises a local semantic attribute of each of the at least one image region, the image region comprises the at least one to-be-aligned image region, or comprises the aligned image region, and
the processor is further configured to:
   determine a target image enhancement strategy corresponding to each of the at least one image region according to the local semantic attribute,
   obtain an enhanced image corresponding to each of the at least one image region by performing image enhancement on each of the at least one image region according to the target image enhancement strategy corresponding to each of the at least one image region, and
   obtain the target image by splicing the enhanced image corresponding to each of the at least one image region.

17. The electronic device according to claim 16, wherein types of the local semantic attribute comprise at least one attribute type of noise intensity, detail richness, brightness, or edge sharpness.

18. The electronic device according to claim 11, wherein the to-be-processed image is an original image collected by an image sensor or a target image obtained after processing the original image according to at least one image processing strategy of a color adjustment strategy, an image enhancement strategy, or an image alignment strategy.

* * * * *